United States Patent
Forbes et al.

[11] Patent Number: 6,062,599
[45] Date of Patent: May 16, 2000

[54] AIR BAG INFLATOR

[75] Inventors: William C. Forbes, Rochester Hills; Tracy S. Sparks, Lapeer, both of Mich.; Jack L. Blumenthal, Los Angeles, Calif.

[73] Assignee: TRW Vehicle Safety Systems Inc., Lyndhurst, Ohio

[21] Appl. No.: 09/076,770

[22] Filed: May 12, 1998

[51] Int. Cl.$^7$ .................................................. B60R 21/26
[52] U.S. Cl. .................. 280/737; 137/68.23; 137/68.27; 220/89.2
[58] Field of Search .................................. 280/737, 741, 280/742; 137/68.11, 68.19, 68.23, 68.24, 68.27; 220/89.1, 89.2; 222/3

[56] References Cited

U.S. PATENT DOCUMENTS

| | | | |
|---|---|---|---|
| 4,301,938 | 11/1981 | Wood et al. ............................ | 220/89.3 |
| 4,512,491 | 4/1985 | DeGood et al. ........................ | 220/89.2 |
| 4,905,722 | 3/1990 | Rooker et al. ........................ | 137/68.27 |
| 5,002,085 | 3/1991 | FitzGerald ............................ | 137/68.27 |
| 5,348,344 | 9/1994 | Blumenthal et al. . | |
| 5,454,592 | 10/1995 | Blumenthal et al. . | |
| 5,603,525 | 2/1997 | Zakula ................................... | 280/737 |
| 5,613,703 | 3/1997 | Fischer ................................. | 280/737 |
| 5,863,066 | 1/1999 | Blumenthal ............................ | 280/737 |
| 5,893,583 | 4/1999 | Blumenthal et al. ................... | 280/737 |

*Primary Examiner*—Paul N. Dickson
*Attorney, Agent, or Firm*—Tarolli, Sundheim, Covell, Tummino & Szabo L.L.P.

[57] ABSTRACT

An apparatus (10) for inflating an inflatable vehicle occupant protection device includes a container (12) having a chamber (14), and inflation fluid (16) under pressure in the chamber for inflating the inflatable device. The apparatus (10) includes an outlet opening (70) in the container (12) for directing inflation fluid (16) from the chamber (14) to the inflatable device. The apparatus (10) also includes an initiator (110) for, when ignited, producing combustion products (130). The apparatus (10) further includes a support member (30) for supporting the initiator means (110) adjacent to the chamber (14). An inlet opening (58) in the container (12) spaced apart from the outlet opening (70) directs combustion products (130) from the initiator (110) into the chamber (14). The apparatus (10) includes a single, one-piece burst disc (80) having a first portion (82) blocking the inlet opening (58) and a second portion (90) blocking the outlet opening (70). The first portion (82) of the burst disc (80) ruptures upon ignition of the initiator (110). The second portion (90) of the burst disc (80) ruptures after the rupturing of the first portion (82) to enable flow of inflation fluid (16) from the chamber (14) through the outlet opening (70) to the inflatable device.

37 Claims, 6 Drawing Sheets

AIR BAG INFLATOR

BACKGROUND OF THE INVENTION

1. Technical Field

The present invention relates to an inflator, and particularly relates to an inflator for an inflatable vehicle occupant protection device, such as an air bag.

2. Description of the Prior Art

An inflator for an inflatable vehicle occupant protection device, such as an air bag, may include a pressure vessel containing inflation fluid under pressure. Such an inflator is disclosed in U.S. Pat. No. 5,348,344. In the inflator disclosed in U.S. Pat. No. 5,348,344, the inflation fluid is an ingredient in a mixture of gases. The mixture of gases also includes a fuel gas which, when ignited, heats the inflation fluid. Rupturable wall portions of the pressure vessel, or burst discs, are used to seal the mixture of gases in the pressure vessel.

The inflator includes an igniter which is actuated electrically when the air bag is to be inflated. The igniter produces combustion products which, in turn, ignite the fuel gas in the pressure vessel. The fluid pressure inside the pressure vessel is increased by the heat generated upon combustion of the fuel gas. When the increasing fluid pressure reaches a predetermined elevated level, the burst disc ruptures as a result. The inflation fluid then flows outward from the pressure vessel and into the air bag to inflate the air bag.

SUMMARY OF THE INVENTION

The present invention is an apparatus for inflating an inflatable vehicle occupant protection device. The apparatus comprises a container having a chamber, and inflation fluid under pressure in the chamber for inflating the inflatable device. The container has an outlet opening for directing inflation fluid from the chamber to the inflatable device. The apparatus also includes initiator means for, when ignited, producing combustion products. The apparatus further includes support means for supporting the initiator means adjacent to the chamber. An inlet opening in the container spaced apart from the outlet opening directs combustion products from the initiator means into the chamber. A single, one-piece burst disc has a first portion blocking the inlet opening and a second portion blocking the outlet opening. The first portion of the burst disc ruptures upon ignition of the initiator means. The second portion of the burst disc ruptures after the rupturing of the first portion to enable flow of inflation fluid from the chamber through the outlet opening to the inflatable device.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
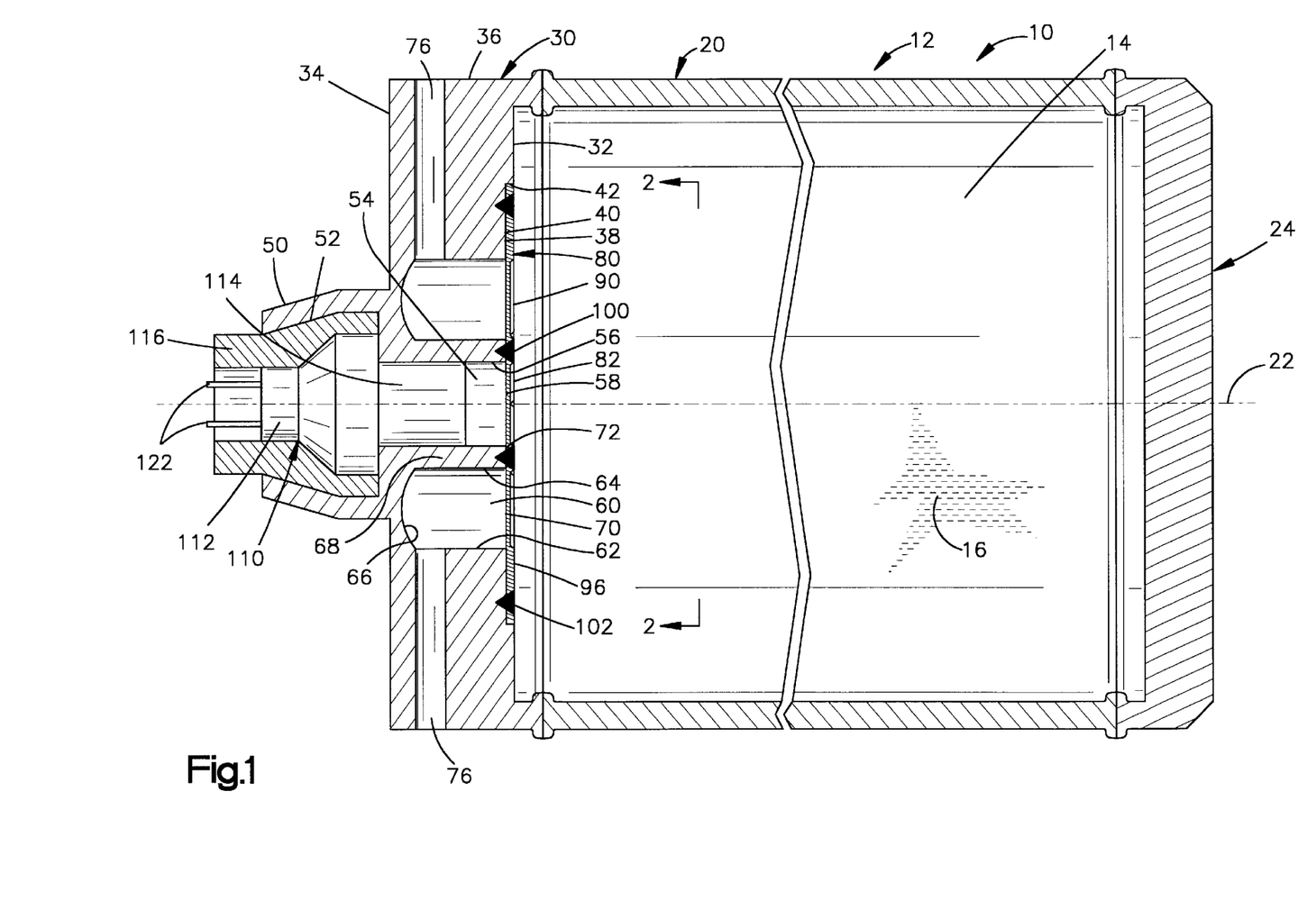
FIG. 1 is a schematic view of an air bag inflator in accordance with the present invention, shown in an unactuated condition.

The present invention relates to an inflator, and particularly relates to an inflator for an inflatable vehicle occupant protection device, such as an air bag. As representative of the present invention, FIG. 1 illustrates an inflator 10 constructed in accordance with a first embodiment of the present invention.

The inflator 10 includes a container 12 defining a storage chamber 14 containing fluid 16 under pressure. The container 12 is preferably made from steel.

The fluid 16 contained under pressure in the storage chamber 14 preferably comprises inflation fluid for an inflatable vehicle occupant protection device (not shown) such as an air bag. The inflation fluid preferably includes a combustible mixture of gases including a primary gas and a fuel gas. The primary gas comprises the majority of the inflation fluid that inflates the air bag. The fuel gas, when ignited, heats the primary gas. The combustible mixture of gases may have a composition as described in U.S. Pat. No. 5,348,344. The storage pressure is preferably within the range of approximately 1,500 psig to approximately 6,000 psig.

The container 12 includes a cylindrical side wall member 20 centered on an axis 22 of the inflator 10. The container 12 also includes a radially extending first end cap 24. The first end cap 24 is friction welded to the side wall member 20 at a first end (the right end as viewed in FIG. 1) of the inflator 10.

The container 12 includes a second end cap or manifold 30. The manifold 30 is friction welded to the side wall member 20 of the container 12 at a second end (the left end as viewed in FIG. 1) of the inflator 10. The manifold 30 is formed as one piece from metal, preferably from the same material as the other portions of the container 12.

The manifold 30 has a generally disc-shaped configuration including planar, radially extending inner and outer end surfaces 32 and 34 and a cylindrical outer side surface 36. A shallow, circular recess 38 is formed in the inner end surface 32 of the manifold 30. The recess 38 is defined by a planar, radially extending surface 40 and an annular, axially extending surface 42.

The manifold 30 includes a tubular igniter support 50 which extends axially outward from the outer end surface 34 of the manifold 30. The igniter support 50 defines a generally cylindrical igniter chamber 52 in the manifold 30.

The igniter chamber 52 communicates with a cylindrical inlet passage 54 in the manifold 30. The inlet passage 54 is defined by a cylindrical surface 56 centered on the axis 22. The inlet passage 54 terminates in a circular inlet opening 58 in the recessed surface 40 of the manifold 30. The inlet opening 58 is centered on the axis 22.

The manifold 30 has an annular outlet passage 60 located radially outward of the inlet passage. The outlet passage 60 is defined by a cylindrical outer side surface 62, a cylindrical inner side surface 64, and a part-spherical end surface 66. The outlet passage 60 is centered on the axis 22 and is separated radially from the inlet passage 54 by an annular, non-rupturing wall portion 68 of the manifold 30. The wall portion 68 of the manifold 30 blocks fluid flow between the inlet passage 54 and the outlet passage 60. The wall portion 68 has an annular end surface 72 facing inward of the chamber 14.

The outlet passage 60 terminates in an annular outlet opening 70 in the recessed surface 40 of the manifold 30. The outlet opening 70 is located radially outward of the inlet opening 58. The outlet opening 70 is separated radially from the inlet opening 58 by the annular surface portion 72 on the wall portion 68 of the manifold 30.

A plurality of cylindrical gas exit ports 76 extend radially outward from the outlet passage 60. The exit ports 76 extend to the exterior of the manifold 30, for directing inflation fluid from the outlet passage 60 into the air bag.

The inflator 10 includes a burst disc 80 for closing the inlet opening 58 and the outlet opening 70. The burst disc 80 is made as one piece from a single continuous body or piece of homogeneous material, preferably steel.

The burst disc 80 (FIG. 2) has a first rupturable portion 82 which overlies the inlet opening 58. The first rupturable portion 82 has a circular configuration centered on the axis 22. The first rupturable portion 82 of the burst disc 80 is defined by a plurality of linear, radially extending first score lines 84. The first score lines 84 are formed in a cruciform configuration centered on the axis 22. An annular, non-rupturing portion 86 of the burst disc 80 is located radially outward of the first rupturable portion 82 of the burst disc.

Figure 2:
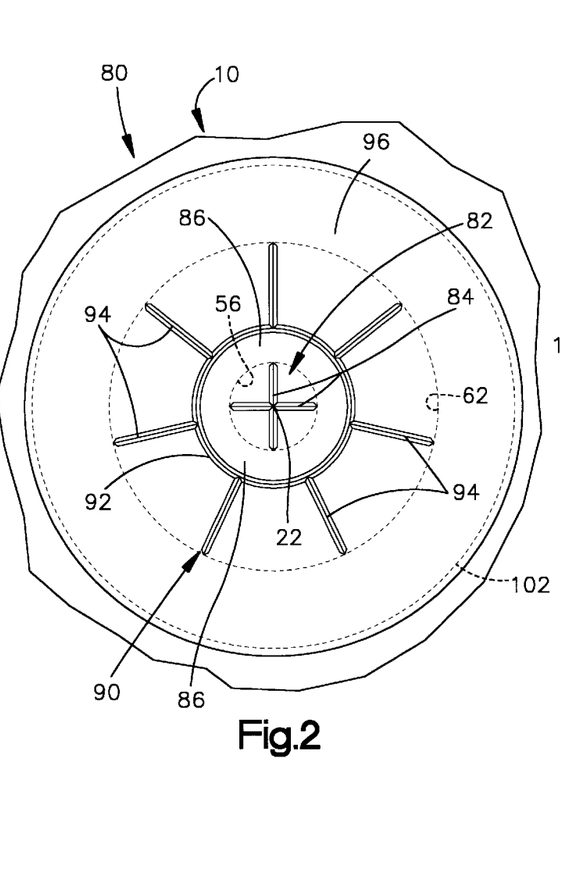
FIG. 2 is a plan view of a burst disc which forms a part of the inflator of FIG. 1.

The burst disc 80 has a second rupturable portion 90, which overlies the outlet opening 70. The second rupturable portion 90 of the burst disc 80 is located radially outward of the non-rupturing portion 86 and, thus, radially outward of the first rupturable portion 82. The second rupturable portion 90 of the burst disc 80 has an annular configuration centered on the axis 22 and is defined by a plurality of second score lines. The plurality of second score lines includes a circular score line 92 which defines the radially inner boundary of the second rupturable portion 90 of the burst disc 80. The plurality of second score lines also includes a plurality of linear score lines 94 which extend radially outward from the circular score line 92.

A first circumferentially extending weld 100 fixes and seals the annular non-rupturing portion 86 of the burst disc 80 to the annular wall portion 68 of the manifold 30. The weld 100 is located radially outward of the first rupturable portion 82 of the burst disc 80 and, thus, radially outward of the inlet passage 54.

Another annular, non-rupturing outer portion 96 of the burst disc 80 is located radially outward of the second rupturable portion 90 of the burst disc. A second circumferentially extending weld 102 fixes and seals the non-rupturing outer portion 96 of the burst disc 80 to the manifold 30. The weld 102 is located radially outward of the second rupturable portion 90 of the burst disc 80 and, thus, radially outward of the outlet passage 60. When the burst disc 80 is welded to the manifold 30 and the storage chamber 14 is pressurized, the pressure of the fluid 16 in the storage chamber forces the burst disc firmly against the recessed surface 40 of the manifold.

The inflator 10 further includes an igniter 110 which functions to ignite the combustible mixture of gases 16 in the storage chamber 14. The igniter 110 has a first portion 112 located within the igniter chamber 52 and a second portion 114 located in the inlet passage 54. The igniter 110 is held in the igniter support 50 by a retainer member 116 and by crimping of the igniter support.

The igniter 110 is a conventional automotive squib with a pair of terminals 122. A small charge of pyrotechnic material is contained in the igniter 110. The pyrotechnic material is ignitable in a known manner upon the passage of electric current through the igniter 110 between the terminals 122.

The terminals 122 of the igniter 110 are connected with vehicle electric circuitry (not shown) including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag or other vehicle occupant protection device is desired to help protect an occupant of the vehicle.

When the sensor senses a collision-indicating condition at or above the predetermined threshold level, the switch closes and the igniter 110 is actuated electrically. The igniter 110 produces hot combustion products as indicated schematically by the arrows 130 in FIG. 3.

The combustion products 130 of the igniter 110 fill the inlet passage 54 and contact the first rupturable portion 82 of the burst disc 80. The pressure of the combustion products 130 of the igniter 110, in the inlet passage 54, ruptures the first rupturable portion 82 of the burst disc 80. The first rupturable portion 82 of the burst disc 80 tears open at the first score lines 84, forming petals which bend into the chamber 14 as illustrated in FIG. 3.

The combustion products 130 of the igniter 110 flow into the storage chamber 14 and ignite the fuel gas in the mixture of gases 16 in the storage chamber. The heat generated by combustion of the fuel gas increases the fluid pressure in the storage chamber 14. When the increasing fluid pressure reaches a predetermined elevated level, the pressure ruptures the second rupturable portion 90 of the burst disc 80. The second rupturable portion 90 of the burst disc 80 tears open at the second score lines 92 and 94, forming petals which bend into the outlet passage 60 as illustrated in FIG. 3.

Figure 3:
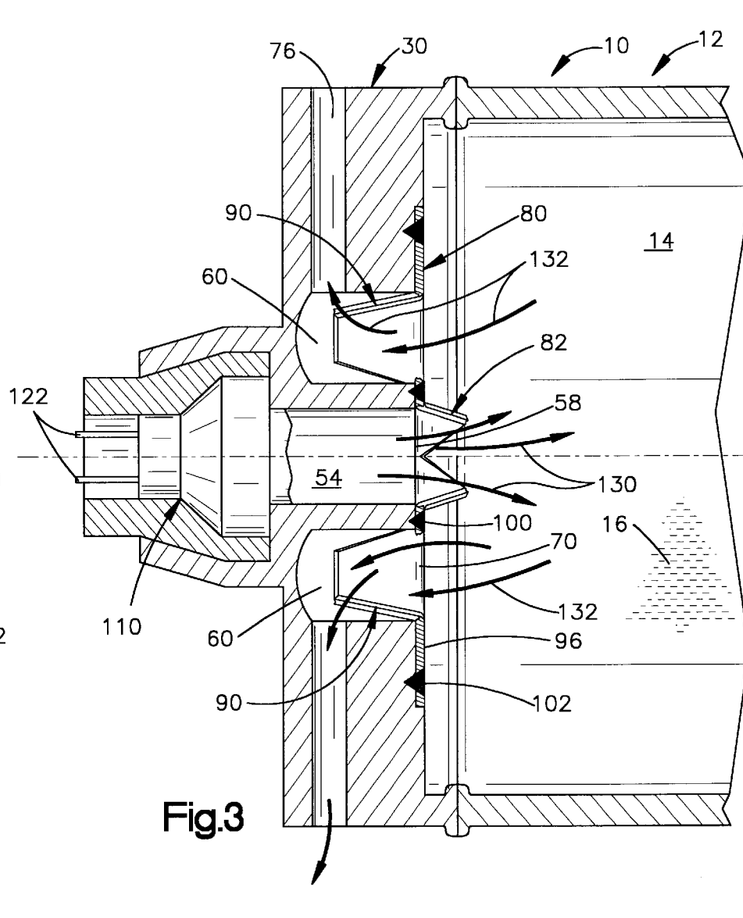
FIG. 3 is a view similar to FIG. 1 showing parts of the inflator in an actuated condition.

The mixture of gases 16 is thus released to flow outward from the storage chamber 14 into the manifold 30 as indicated by the arrows 132 in FIG. 3. The inflation fluid flows out of the inflator 10 via the exit ports 76. The fuel gas in the mixture of gases 16 is substantially consumed by combustion. All fluid flow out of the inflator is through the outlet passage 60; the igniter 110 blocks fluid flow out of the inflator through the inlet passage 54.

Figure 4:
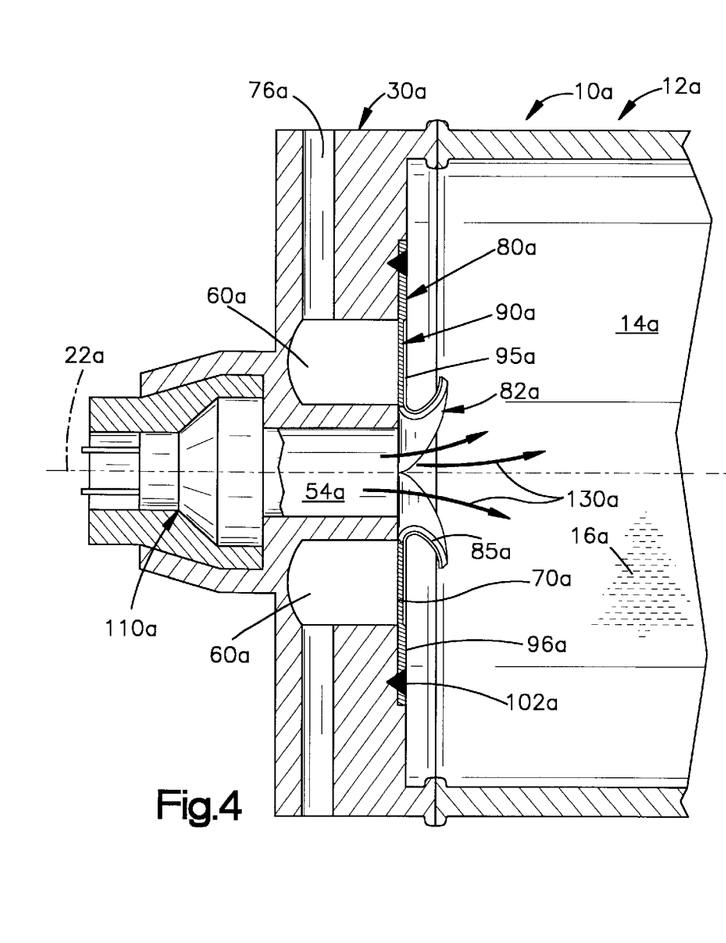
FIG. 4 is a view similar to FIG. 3 of an inflator in accordance with a second embodiment of the present invention, shown in a partially actuated condition.
Figure 5:
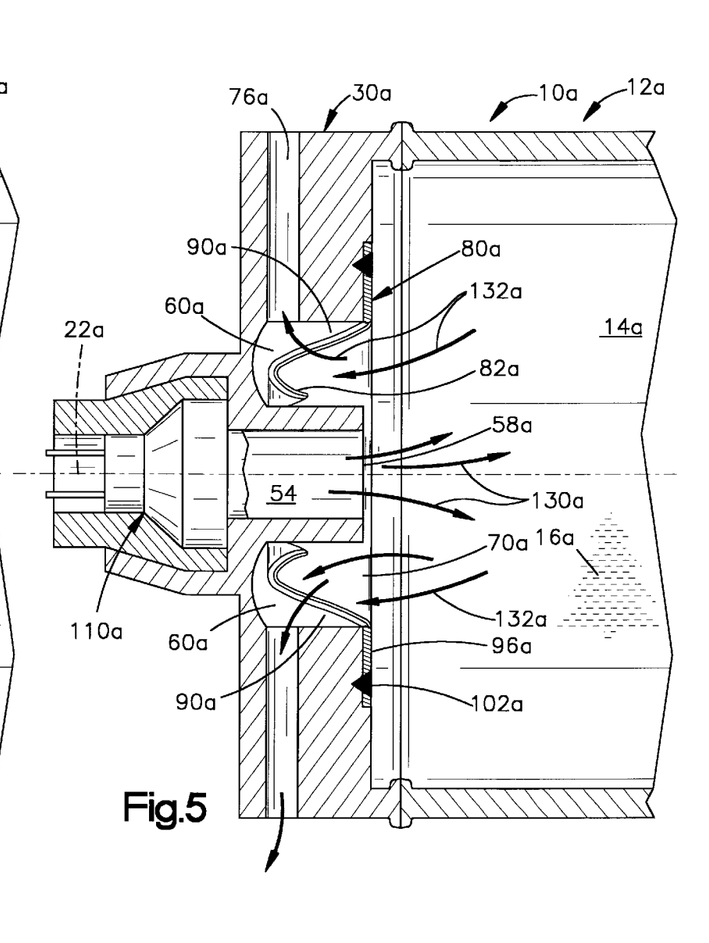
FIG. 5 is a view of the inflator of FIG. 4, shown in a fully actuated condition.
Figure 6:
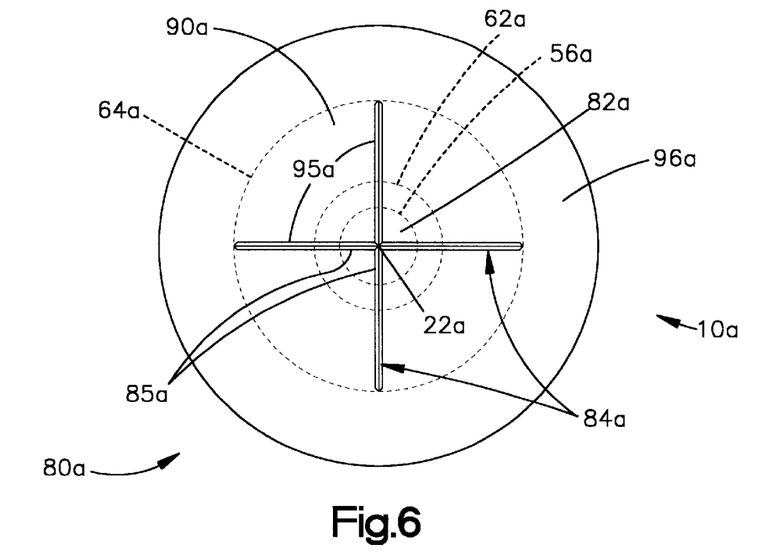
FIG. 6 is a plan view of a burst disc which forms a part of the inflator of FIG. 4.

FIGS. 4–6 illustrate portions of an inflator 10*a* which is constructed in accordance with a second embodiment of the present invention. The inflator 10*a* is generally similar in construction to the inflator 10. Similar or identical parts of the inflators 10 and 10*a* are given similar reference numerals, with the suffix "a" added for clarity to the reference numerals for the parts of the inflator 10*a*.

The inflator 10*a* includes a burst disc 80*a* (FIG. 6) which has a single pair of linear, radially extending score lines 84*a*. The score lines 84*a* are formed in a cruciform configuration centered on the axis 22*a*.

A rupturable first portion 82a of the burst disc 80a overlies the inlet opening 58a. The first portion 82a has a circular configuration centered on the axis 22a. The radially outer periphery of the first portion 82a of the burst disc 80a is defined by the radially inner surface 56a on the support portion 68a of the manifold 30a. The first portion 82a of the burst disc 80a encompasses radially inner portions 85a of the radial score lines 84a.

The burst disc 80a has a rupturable second portion 90a, overlying the outlet opening 70a. The second portion 90a of the burst disc 80a is located radially outward of the first portion 82a and has an annular configuration centered on the axis 22a. The radially inner and outer peripheries of the second portion of the burst disc are defined by the radially outer and inner surfaces 62a and 64a of the outlet passage 60a in the manifold 30a. The second portion 90a of the burst disc 80a encompasses radially outer portions 95a of the radial score lines 84a. The score lines 84a are continuous from the axis 22a to the outer periphery of the second portion 90a of the burst disc 80a.

An annular, non-rupturing outer portion 96a of the burst disc 80a is located radially outward of the second portion 90a of the burst disc. A single, circumferentially extending weld 102a (FIG. 4) fixes and seals the non-rupturing outer portion 96a of the burst disc 80a to the manifold 30a. The weld 102a is located radially outward of both the first and second portions 82a and 90a of the burst disc 80a.

The chamber 14a preferably contains an inflation fluid 16a which comprises only a single gas, such as argon or helium, which is non-ignitable. There is no ignitable material or fuel gas in the chamber 14a. Thus, the inflator 10a is a "cold gas" type of inflator in which the inflation fluid is not significantly heated to increase its pressure. Alternatively, the inflator 10a could include an ignitable material or fuel gas in the chamber 14a, as in the inflator 10 (FIGS. 1–3).

When the igniter 110a (FIG. 4) is energized electrically, it produces hot combustion products as indicated schematically by the arrows 130a in FIG. 4. The combustion products 130a of the igniter 110a fill the inlet passage 54a and contact the first portion 82a of the burst disc 80a. The pressure of the combustion products 130a of the igniter 110a, in the inlet passage 54a, ruptures the first portion 82a of the burst disc 80a. The first portion 82a of the burst disc 80a tears open along the radially inner portions 85a of the score lines 84a, forming petals which bend into the storage chamber 14a as illustrated in FIG. 4.

Because the radial score lines 84a are continuous and the burst disc 80a is not welded to the annular support portion 68a of the manifold 30a, the tearing action of the burst disc continues radially outward, past the support portion 68a, under the force of the combustion products 130a of the igniter 110a. The second portion 90a of the burst disc 80a ruptures, in response to the rupturing of the first portion 82a, along the radially outer portions 95a of the radial score lines 84a. The burst disc 80a opens to a condition shown in FIG. 5 in which the first and second portions 82a and 90a of the burst disc 80a, together, form petals which extend radially inward from the non-rupturing outer portion 96a of the burst disc and which are bent away from the storage chamber 14a, that is, into the outlet passage 60a.

The inflation fluid 16a in the storage chamber 14a is thus released to flow outward from the storage chamber into the manifold 30a as indicated by the arrows 132a in FIG. 5. The inflation fluid 16a flows out of the inflator 10a via the exit ports 76a. Because the burst disc 80a opens completely under the influence of the combustion products 130a of the igniter 110a, inflation fluid from the inflator 10a flows into the air bag almost immediately. This is in contrast to the actuation of the inflator 10 (FIGS. 1–3), in which inflation fluid does not flow into the air bag until both (a) the ignitable material in the stored gas 16 is ignited, and (b) the chamber 14 pressurizes sufficiently to rupture the second rupturable portion 90 of the burst disc 80.

Further, no increase in pressure in the chamber 14a is required to start fluid flow into the air bag; the initial opening of the center portion 82a of the burst disc 80a, by itself, results in the opening of the outer portion 90a of the burst disc. This is in contrast to the inflator construction shown in FIGS. 1–3 in which a substantial increase in pressure in the chamber is needed to open the outer rupturable portion 90 of the burst disc 80.

Figure 7:
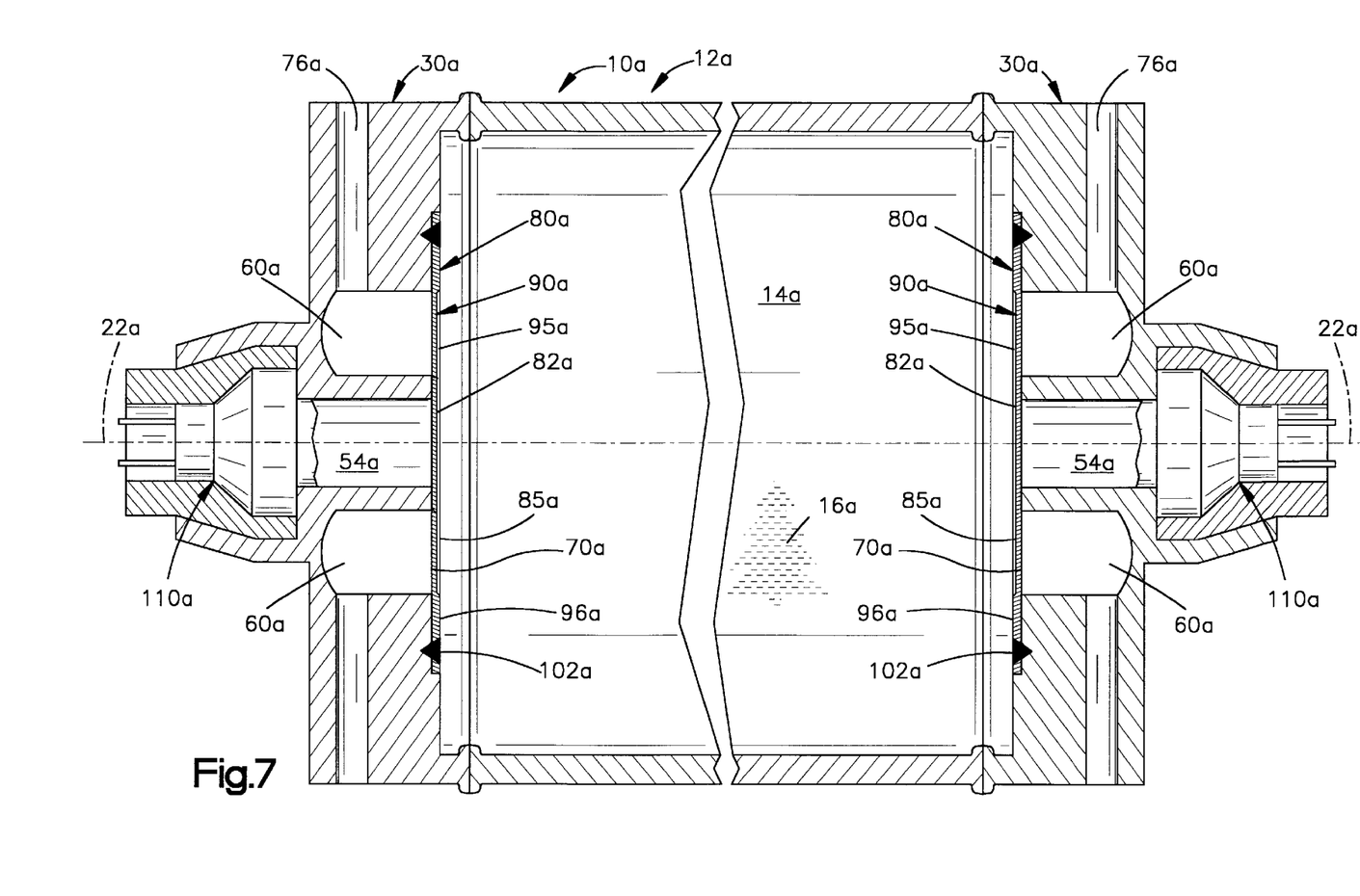
FIG. 7 illustrates an inflator in accordance with a third embodiment of the present invention, shown in an unactuated condition.

FIG. 7 illustrates an inflator 200 which is constructed in accordance with a second embodiment of the present invention. The inflator 200 is a dual stage or "smart" inflator having similar first and second stages 202 and 204, respectively. Each one of the first and second stages 202 and 204 of the inflator 200 is of the same construction and operation as the portions of the inflator 10a illustrated in FIGS. 4–6, and so the parts are numbered the same.

The igniter 110a in the second stage 204 is actuatable independently (either simultaneously or at a different time) of the igniter 110a in the first stage 202. This provides, as known, the ability to tailor the rate of gas flow into the air bag as a function of time.

In addition, the exit ports 76a in the illustrated second stage 204 are larger in diameter than the exit ports 76a in the first stage 202. This size difference provides different gas flow characteristics when the inflation fluid from the chamber 14a is directed from the second stage 204 of the inflator 200. This size difference thus provides another way to tailor the rate of gas flow into the air bag. The two sets of exit ports 76a could alternatively be the same size if desired.

Figure 8:
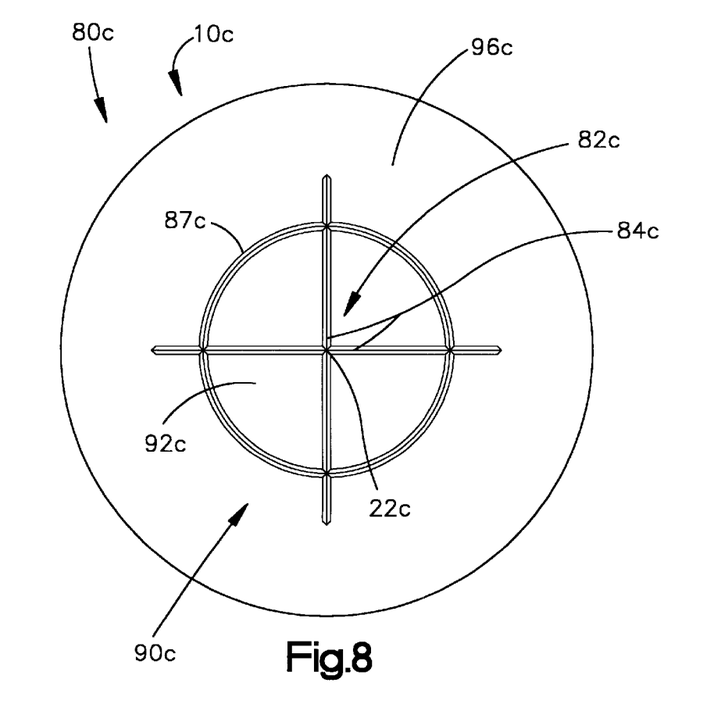
FIG. 8 is a plan view of a burst disc which forms a part of an inflator in accordance with a fourth embodiment of the present invention.

FIG. 8 illustrates a burst disc 80c which forms a part of an inflator 10c constructed in accordance with a fourth embodiment of the present invention (the other parts of the inflator 10c are not shown). The burst disc 80c of the inflator 10c is generally similar in construction to the burst disc 80a (FIG. 6) of the inflator 10a. The burst disc 80c, in addition to the continuous radial score lines 84c, also has a circular score line 87c located over the radial center of the outlet passage 60c in the manifold 30c of the inflator 10c. The presence of the circular score line 87c can make it easier for the burst disc 80c to open as a result solely of a pressure increase in the gas storage chamber of the inflator 10c. This helps to ensure release of any pressurized fluid from the inflator 10c in the event of, for example, excessive ambient temperatures such as can occur in a vehicle fire.

Figure 9:
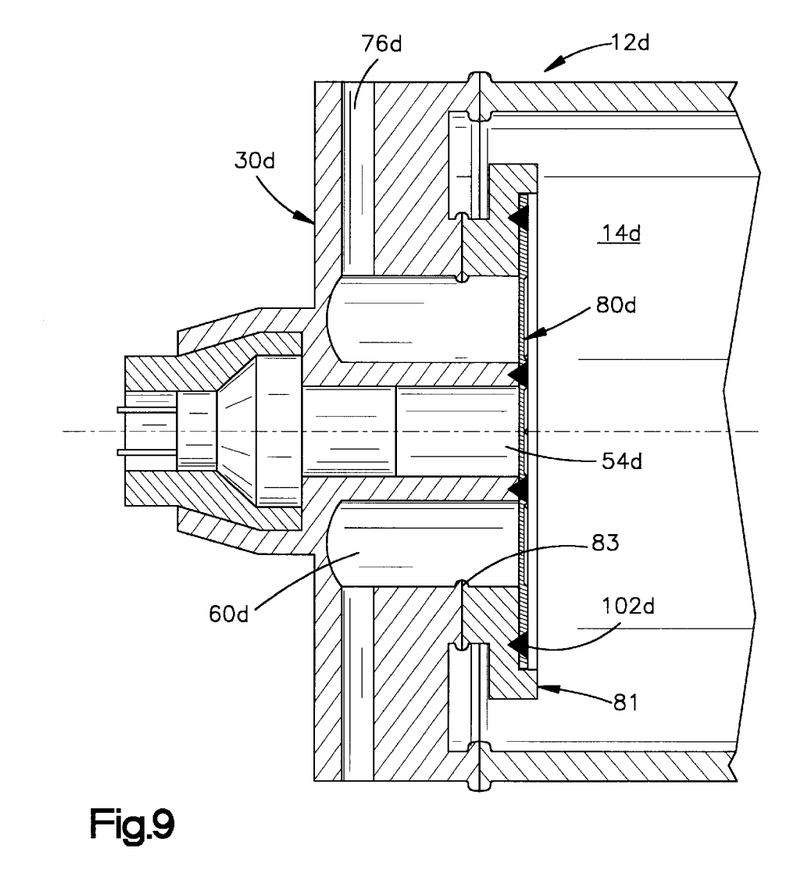
FIG. 9 illustrates a portion of an inflator constructed in accordance with a fifth embodiment of the present invention.

FIG. 9 illustrates a portion of an inflator 10d constructed in accordance with a fifth embodiment of the present invention. The inflator 10d is generally similar in construction to the inflator 10b (FIG. 6) and similar parts are given the same reference numerals with the suffix "d" added to distinguish them.

In the inflator 10d, the inflator body, including the end cap 30d, is made from aluminum rather than from steel. The burst disc 80d is made from stainless steel or Inconel and is laser welded to a stainless steel burst disc holder 81 which forms a part of the container 12d. The burst disc holder 81 is a ring-shaped member extending around the outlet passage 60d and disposed axially inward of the end cap 30d. The burst disc holder 81 is, in turn, friction welded or inertia welded at 83 to the aluminum end cap 30d.

The provision of the burst disc holder 81 makes it possible to effect a seal between the stainless steel burst disc 80d and the aluminum end cap 30d; the different properties of these two materials would otherwise make such a seal difficult to obtain. As a result, the inflator 10d can be made with an aluminum rather than steel body, as may be desirable.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, said apparatus comprising:
    a container having a chamber;
    inflation fluid under pressure in said chamber for inflating the inflatable device;
    an outlet opening in said container for directing inflation fluid from said chamber to the inflatable device;
    initiator means for, when ignited, producing combustion products;
    support means for supporting said initiator means adjacent to said chamber;
    an inlet opening in said container spaced apart from said outlet opening, said inlet opening being for directing combustion products from said initiator means into said chamber;
    a single, one-piece burst disc having a first portion blocking said inlet opening and a second portion blocking said outlet opening;
    said first portion of said burst disc rupturing upon ignition of said initiator means;
    said second portion of said burst disc rupturing after the rupturing of said first portion to enable flow of inflation fluid from said chamber through said outlet opening to the inflatable device.

2. An apparatus as set forth in claim 1 wherein said burst disc is made from a single piece of homogeneous material.

3. An apparatus as set forth in claim 1 wherein said burst disc has score lines consisting of a single pair of score lines arranged in a cruciform configuration and extending across both said first portion and said second portion of said burst disc.

4. An apparatus as set forth in claim 1 wherein said burst disc has a single pair of score lines arranged in a cruciform configuration and extending across both said first portion and said second portion of said burst disc, and a circular score line extending circumferentially over said outlet opening.

5. An apparatus as set forth in claim 1 wherein said container has a non-rupturing wall portion separating said inlet opening from said outlet opening and blocking fluid flow between said inlet opening and said outlet opening.

6. An apparatus as set forth in claim 1 wherein said inflation fluid contains an ignitable material which is ignited by combustion products of said igniter flowing into said chamber in response to rupturing of said first portion of said burst disc thereby to increase the pressure in said chamber, said second portion of said burst disc rupturing in response to the increase of pressure in said chamber to enable flow of fluid under pressure from said chamber to the inflatable device.

7. Apparatus as defined in claim 1 wherein said inflation fluid is free of ignitable material.

8. An apparatus as set forth in claim 1 comprising means for blocking flow of inflation fluid out of said chamber through said inlet opening.

9. An apparatus as set forth in claim 1 comprising means for securing said burst disk to said container, said means for securing consisting of a single weld.

10. An apparatus as set forth in claim 1 wherein said inlet opening has a circular configuration and said outlet opening has an annular configuration extending around said inlet opening, said container having a non-rupturing wall portion which separates said inlet opening from said outlet opening, said first portion of said burst disc having a circular configuration and said second portion of said burst disc having an annular configuration extending around said first rupturable portion of said burst disc.

11. An apparatus as set forth in claim 1 wherein said container comprises a metal end cap and a metal burst disc holder welded to said end cap, said burst disc being welded to said burst disc holder.

12. An apparatus as set forth in claim 11 wherein said end cap is made from aluminum and said burst disc holder is made from steel and said burst disc is made from steel.

13. An apparatus for inflating an inflatable vehicle occupant protection device, said apparatus comprising:
    a container having a chamber;
    inflation fluid under pressure in said chamber for inflating the inflatable device;
    an outlet opening in said container for directing inflation fluid from said chamber to the inflatable device;
    initiator means for, when ignited, producing combustion products;
    support means for supporting said initiator means adjacent to said chamber;
    an inlet opening in said container for directing combustion products from said initiator means into said chamber;
    a burst disc having a first portion blocking said inlet opening and a second portion blocking said outlet opening in said container;
    said first portion of said burst disc rupturing in response to ignition of said initiator means to enable flow of combustion products of said initiator means into said chamber;
    said second portion of said burst disc rupturing in response to rupturing of said first portion to enable flow of inflation fluid from said chamber through said outlet opening to the inflatable device; and
    means for blocking flow of inflation fluid out of said chamber through said inlet opening.

14. An apparatus as set forth in claim 13 wherein said means for blocking flow of inflation fluid out of said chamber through said inlet opening comprises an igniter.

15. An apparatus as set forth in claim 13 wherein said inlet opening has a circular configuration and said outlet opening has an annular configuration extending around said inlet opening, said container having a non-rupturing wall portion which separates said inlet opening from said outlet opening, said first portion of said burst disc having a circular configuration and said second portion of said burst disc having an annular configuration extending around said first rupturable portion of said burst disc.

16. An apparatus as set forth in claim 13 wherein said burst disc is made from a single piece of homogeneous material.

17. An apparatus as set forth in claim 15 wherein said burst disc has score lines consisting of a single pair of score lines arranged in a cruciform configuration and extending across both said first portion and said second portion of said burst disc.

18. An apparatus as set forth in claim 13 wherein said inflation fluid contains an ignitable material which is ignited by combustion products of said igniter flowing into said chamber in response to rupturing of said first portion of said burst disc thereby to increase the pressure in said chamber, said second portion of said burst disc rupturing in response to the increase of pressure in said chamber to enable flow of fluid under pressure from said chamber to the inflatable device.

19. Apparatus as defined in claim 13 wherein said inflation fluid is free of ignitable material.

20. An apparatus as set forth in claim 13 wherein said container comprises a metal end cap and a metal burst disc holder welded to said end cap, said burst disc being welded to said burst disc holder.

21. An apparatus as set forth in claim 20 wherein said end cap is made from aluminum and said burst disc holder is made from steel and said burst disc is made from steel.

22. An apparatus as set forth in claim 13 comprising means for securing said burst disk to said container, said means for securing consisting of a single weld.

23. An apparatus comprising:
a container having an inlet opening and an outlet opening; and
a single, one-piece burst disc covering said inlet opening and covering said outlet opening;
said burst disc having a first rupturable portion defined by first score lines and covering said inlet opening and which ruptures to enable material to enter said container through said inlet opening, said burst disc having a second rupturable portion defined by second score lines and covering said outlet opening and which ruptures to enable material to exit from said container through said outlet opening.

24. An apparatus as set forth in claim 23 wherein said first rupturable portion of said burst disc has a generally circular configuration and said second rupturable portion of said burst disc has an annular configuration extending around said first rupturable portion of said burst disc.

25. An apparatus as set forth in claim 23 wherein said container contains a combustible mixture of gases, said apparatus further comprising an igniter which, when actuated, emits pyrotechnic combustion products under pressure that cause said first rupturable portion of said burst disc to be ruptured to enable flow of said pyrotechnic combustion products into said container.

26. An apparatus as set forth in claim 25 wherein the flow of said pyrotechnic combustion products into said container ignites said combustible mixture of gases to increase the pressure in said chamber, the increase in pressure rupturing said second rupturable portion of said burst disc to enable said mixture of gases to flow from said container.

27. An apparatus as set forth in claim 23 wherein said inlet opening has a circular configuration and said outlet opening has an annular configuration extending around said inlet opening, said container having a non-rupturing wall portion which separates said inlet opening from said outlet opening, said first rupturable portion of said burst disc having a circular configuration and said second rupturable portion of said burst disc having an annular configuration extending around said first rupturable portion of said burst disc, said burst disc having a non-rupturable portion which separates said first rupturable portion from said second rupturable portion.

28. A burst disc for use in an apparatus for inflating an inflatable vehicle occupant protection device, the apparatus including a container having a chamber, a source of inflation fluid under pressure in the chamber for inflating the inflatable device, an annular first opening in the container for directing inflation fluid from the chamber to the inflatable device, and a circular second opening in the container and disposed radially inward of the first opening;
said burst disc comprising a single, one-piece burst disc having a first rupturable portion for covering the second opening and having a second rupturable portion for covering the first opening;
said burst disc having a first plurality of score lines consisting of a single pair of score lines arranged in a cruciform configuration and defining said first rupturable portion of said burst disc;
said burst disc having a second plurality of score lines defining said second rupturable portion of said burst disc, said second plurality of score lines comprising a circular score line and a plurality of radial score lines which are spaced apart around said circular score line and which extend radially outward from said circular score line.

29. A burst disc as set forth in claim 28 for use in an apparatus including initiator means for, when ignited, producing combustion products and support means for supporting the initiator means adjacent to the chamber;
wherein said first portion of said burst disc is rupturable under the influence of fluid pressure generated by ignition of the initiator means, and said second portion of said burst disc is rupturable after said first portion to enable flow of inflation fluid from the chamber through the outlet opening to the inflatable device.

30. A burst disc as set forth in claim 28 wherein said circular score line is positionable at the radially inward edge of the annular first opening, said radial score lines in said second plurality of score lines extendable radially across substantially the entire extent of the first opening.

31. A burst disc as set forth in claim 28 wherein said burst disc has an annular, non-rupturing portion separating said first rupturable portion from said second rupturable portion.

32. An apparatus for inflating an inflatable vehicle occupant protection device, said apparatus comprising:
a container having a chamber;
inflation fluid under pressure in said chamber for inflating the inflatable device;
a first outlet opening in said container for directing inflation fluid from said chamber to the inflatable device;
first initiator means for, when ignited, producing combustion products;
first support means for supporting said first initiator means adjacent to said chamber;
a first inlet opening in said container spaced apart from said first outlet opening, said first inlet opening being for directing combustion products from said first initiator means into said chamber;
a one-piece first burst disc having a first portion blocking said first inlet opening and a second portion blocking said first outlet opening;
a second outlet opening in said container for directing inflation fluid from said chamber to the inflatable device;

second initiator means for, when ignited, producing combustion products;

second support means for supporting said second initiator means adjacent to said chamber;

a second inlet opening in said container spaced apart from said second outlet opening, said second inlet opening being for directing combustion products from said second initiator means into said chamber; and a one-piece second burst disc having a first portion blocking said second inlet opening and a second portion blocking said second outlet opening.

33. An apparatus as set forth in claim 32 comprising means for securing said first burst disk to said container, consisting of a single weld; and means for securing said second burst disk to said container, consisting of a single weld.

34. An apparatus as set forth in claim 32 wherein for each one of said first and second burst discs said first portion of said burst disc ruptures upon ignition of its associated initiator means and said second portion of said burst disc ruptures after the rupturing of said first portion to enable flow of inflation fluid.

35. An apparatus as set forth in claim 32 wherein each one of said first and second burst discs has score lines consisting of a single pair of score lines arranged in a cruciform configuration and extending across both said first portion and said second portion of said burst disc.

36. An apparatus as set forth in claim 32 wherein said inflation fluid contains an ignitable material which is ignited by combustion products of said first initiator means flowing into said chamber in response to rupturing of said first portion of said first burst disc thereby to increase the pressure in said chamber, said second portion of said first burst disc rupturing in response to the increase of pressure in said chamber to enable flow of fluid under pressure from said chamber to the inflatable device.

37. An apparatus as defined in claim 32 wherein said inflation fluid is free of ignitable material.

* * * * *